(12) United States Patent
Bilodeau

(10) Patent No.: US 8,107,804 B2
(45) Date of Patent: Jan. 31, 2012

(54) ENERGY ACCUMMULATOR SYSTEM

(75) Inventor: Stéphane Bilodeau, Sherbrooke (CA)

(73) Assignee: Groupe Énerstat Inc., Sherbrooke, Québec (CA)

( * ) Notice: Subject to any disclaimer, the term of this patent is extended or adjusted under 35 U.S.C. 154(b) by 654 days.

(21) Appl. No.: 12/092,457

(22) PCT Filed: Nov. 6, 2006

(86) PCT No.: PCT/CA2006/001812
§ 371 (c)(1),
(2), (4) Date: Nov. 11, 2008

(87) PCT Pub. No.: WO2007/051310
PCT Pub. Date: May 10, 2007

(65) Prior Publication Data
US 2009/0220220 A1    Sep. 3, 2009

Related U.S. Application Data

(60) Provisional application No. 60/733,801, filed on Nov. 7, 2005.

(51) Int. Cl.
*F28D 7/00* (2006.01)

(52) U.S. Cl. .......................................... 392/496; 237/44

(58) Field of Classification Search ............... 392/496
See application file for complete search history.

(56) References Cited

U.S. PATENT DOCUMENTS

| 4,420,677 A | 12/1983 | Partington |
| 4,714,821 A | 12/1987 | Jakobsson |
| 4,909,041 A | 3/1990 | Jones |

FOREIGN PATENT DOCUMENTS

| CA | 2237323 | 5/1997 |
| CA | 2542376 | 5/2006 |

*Primary Examiner* — Thor Campbell
(74) *Attorney, Agent, or Firm* — Norton Rose Or LLP

(57) ABSTRACT

An energy accumulator system for accumulating heat from a heat source for subsequent supply to a heat demand, comprises an energy accumulator having a storage material in a heat-exchange relation with the heat source so as to store heat produced by the heat source. A controller is connected to the energy accumulator to obtain temperature data with respect to the storage material, and to the heat source so as to selectively actuate the heat source. An energy level calculator is associated with the controller to determine a storage capacity in the energy accumulator as a function of temperature data of the storage material. An operation identifier determines when to store energy in the energy accumulator as a function of the storage capacity and of condition data pertaining to the heat source. The controller actuates the energy accumulator and the heat source to store heat in the energy accumulator.

12 Claims, 2 Drawing Sheets

ENERGY ACCUMMULATOR SYSTEM

CROSS-REFERENCE TO RELATED APPLICATION

The present patent application claims priority on U.S. Provisional Patent Application No. 60/733,801, filed on Nov. 7, 2005.

BACKGROUND OF THE INVENTION

1. Field of the Invention

The present invention relates to energy management and, more particularly to an energy accumulator system used in conjunction with cold or heat sources.

2. Background Art

The ever-increasing costs of energy are associated with numerous factors: increasing energy demand for full capacity supply, diminishing stocks of fossil fuel, volatility of the supply capacity in view of political, geographical and meteorological factors. Therefore, energy management has rapidly evolved to minimize the impact of high energy costs, and cost variations.

It is known to use liquid as a storage medium for energy. For instance, heating systems using water circuits to transfer heat from a central heat source, such as a furnace, to peripheral radiators, in various rooms of the building. Water accumulates heat at the heat source, and releases heat at the radiators.

Liquids have also been used to store cold heat. Ice banks have been developed to store cold heat, for instance at periods of the day when energy costs are lower (e.g., at night). The stored cold heat is then used to fill refrigeration and/or air conditioning needs.

Some products have been used to enhance the storage capacity of the liquids. For instance, alcohols, such as glycol, have been used to change the melting point of the accumulator fluid, so as to store cold latent heat.

Such energy accumulator systems take into account the energy prices as a function of the period of the day. However, other factors should be considered in order to minimize the energy consumption, such as efficiency of operation of the heat or cooling sources.

SUMMARY OF INVENTION

It is therefore an aim of the present invention to provide an energy accumulator system that addresses the issues associated with the prior art.

Therefore, in accordance with the present invention, there is provided an energy accumulator system for accumulating heat from a heat source for subsequent supply to a heat demand, comprising: an energy accumulator having a storage material adapted to be in a heat-exchange relation with the heat source so as to store heat produced by the heat source, a controller connected to the energy accumulator to obtain temperature data with respect to the storage material, and to the heat source so as to selectively actuate the heat source; an energy level calculator associated with the controller, the energy level calculator determining a storage capacity in the energy accumulator as a function of temperature data of the storage material; and an operation identifier associated with the controller, the operation identifier determining when to store energy in the energy accumulator as a function of the storage capacity and of condition data pertaining to the heat source; whereby the controller actuates the energy accumulator and the heat source to store heat in the energy accumulator.

BRIEF DESCRIPTION OF DRAWINGS

Having thus generally described the nature of the invention, reference will now be made to the accompanying drawings, showing by way of illustration a preferred embodiment thereof and in which.

DESCRIPTION OF PREFERRED EMBODIMENTS

Figure 1:
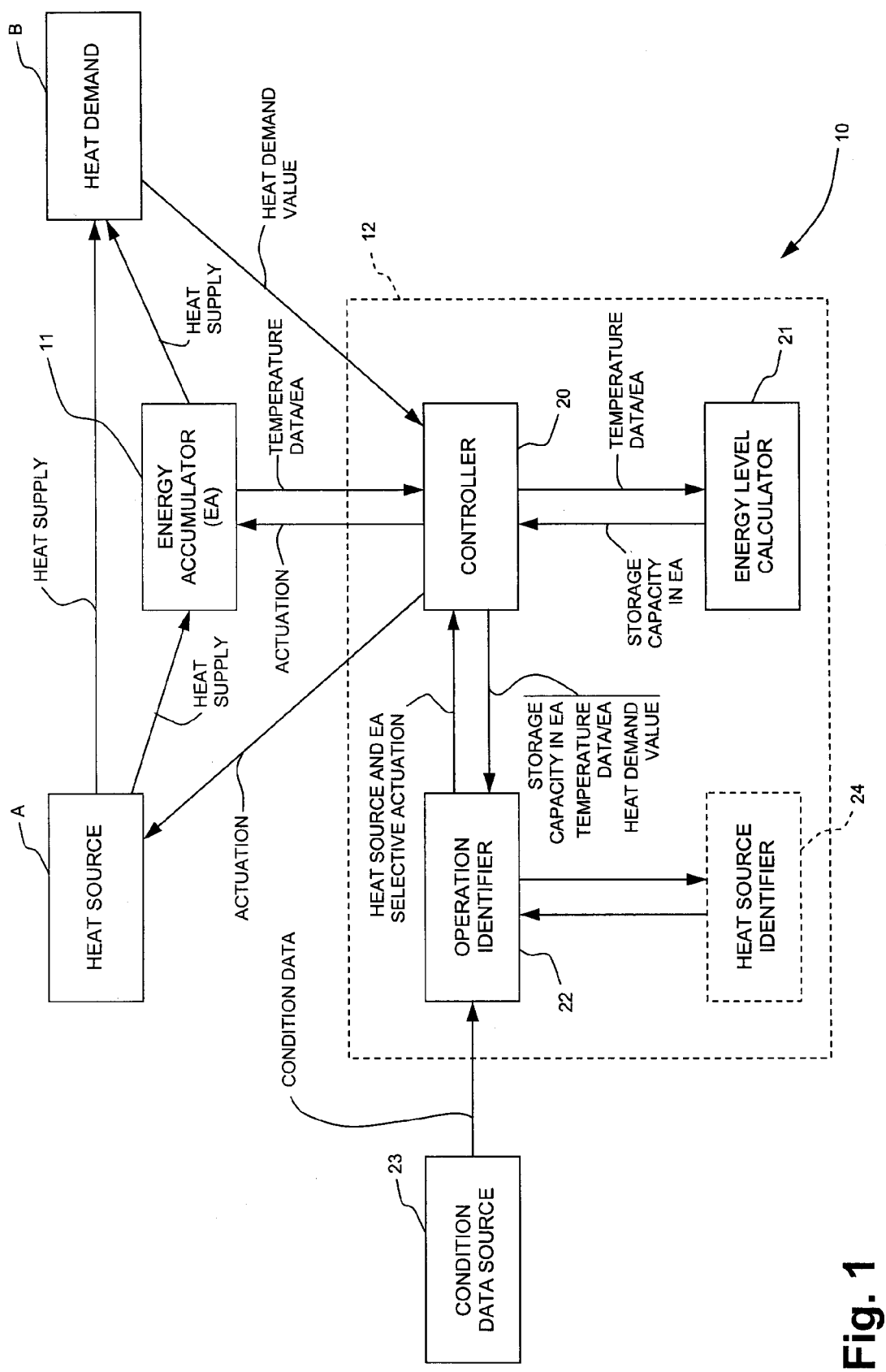
FIG. 1 is a block diagram illustrating an energy accumulator system in accordance with an embodiment of the present invention.

Referring now to the drawings and more particularly to FIG. 1, an energy accumulator system is generally shown at 10, and will hereinafter be referred to as the EAS 10. The EAS 10 is used with systems having a heat source A supplying heat to meet a heat demand B. Whether it be hot heat or cold heat, the heat source A has at least one source of heat (e.g., electric, natural gas, oil boiler, cooling tower, compressor of a refrigeration system, free cooling) The heat demand B (i.e., hot or cold heat demand) is associated with the heat source A, and may be of various types. For instance, the heat demand B may be a heating circuit, a ventilation system having air-conditioning needs, a water circuit requiring cold water, a production line needing steam in the production process, or the like. The use of the expression "heat" refers throughout as either hot heat or cold heat, unless otherwise indicated.

The EAS 10 has an energy accumulator 11. The energy accumulator 11 is a reservoir having a storage material in heat exchange with the heat source A, whether directly or indirectly, and examples thereof will be given hereinafter. In an embodiment, the energy accumulator 11 has a heat-exchanger network (i.e., piping, pumps, etc.) extending between the heat source A and the heat demand B, with a thermo-fluid circulating between the heat source A/heat demand B and the storage material of the energy accumulator.

The storage material is chosen as a function of the heat source A and of the heat demand B, so as to change phases (e.g., solid/liquid, or liquid/vapor) in the process of storing heat. The energy accumulator 11 communicates with the heat source A, to store heat, and with the heat demand B, to supply heat as a function of the demand.

The storage material is chosen so as to change phase (e.g., solid to liquid, liquid to gas or vice-versa) under generally atmospheric pressure within the energy accumulator, following a heat-exchange sequence with a thermo-fluid such as water, ethylene-glycol, propylene glycol, thermal oil, etc. It is preferred that the storage material undergo a phase change (e.g., liquid-solid and vice versa) as a function of the temperature variation required for the first refrigerant, so as to maximize the heat-retaining capacity of the energy accumulator by using the latent heat capacity of the accumulator refrigerant.

The storage material is a compound of different materials which may include biphenyl-diphenyl ether eutectic mixtures, diphenil oxide, drakeol, alkanes, N-paraffin hydrocarbon chains, glycerin, water, carbon tetrabromide, tridecane, tetradecane, pentadecane, hexadecane, heptadecane, hydrocarbon wax, glycerol, 1,2,3-propanetriol, ammonium chloride, potassium chloride, boron trioxide, potassium hydroxide, sodium hydroxide alkanes, appropriately chosen as a function of the heat source A and the heat demand B.

The EAS 10 has a controller system 12. The controller system 12 is a computer having a processor. The control system 12 is connected to the heat source A, to the heat demand B, and to the energy accumulator 11, so as to obtain various information that will be used in operating the heat source A to accumulate heat in optimal conditions.

Referring to FIG. 1, the controller system 12 has a controller 20. The controller 20 is connected to the energy accumulator 11, so as to obtain temperature data, or like parameters, associated with the storage medium.

The controller 20 is also connected to the heat demand, for instance by way of various sensors (e.g., pressure sensors, temperature sensors, and the like), so as to obtain information pertaining to the heat demand.

The controller 20 is connected to the various apparatuses of the heat source A. The controller 20 therefore commands actuation of the heat source A, as a function of the decisions taken by the controller system 12. Moreover, the controller 20 is connected to the energy accumulator 11, such that the energy accumulator 11 is actuatable for receiving the heat supply from the heat source A. For instance, pumps and valves are turned on to ensure heat exchange between the heat source A and the energy accumulator 11.

An energy level calculator 21 is associated with the controller 20. The energy level calculator 21 receives the temperature data pertaining to the storage medium in the energy accumulator 11. With the temperature data, the energy level calculator 21 calculates the real-time storage capacity in the energy accumulator 11. The storage capacity value is the amount of additional energy that can be stored in the energy accumulator 11, under a desired condition of the storage material. Considering that the storage material is preferably to change phase when accumulating heat, the storage capacity value may be a calculation of the proportion of storage material that has yet to change phase (i.e., the capacity to store latent heat).

An operation identifier 22 is associated with the controller 20. The operation identifier 22 receives the storage capacity value of the energy accumulator 11 from the controller 20, as calculated by the energy level calculator 21. Other information that is provided to the operation identifier is the temperature data of the energy accumulator 11, and the heat demand value.

A condition data source 23 is associated with the operation identifier 22. The condition data source 23 provides information to the operation identifier 22, such that the operation identifier 22 can determine when energy should be accumulated in the energy accumulator 11.

The condition data provided by the condition data source 23 takes various forms according to the type of heat source A and of heat demand B. The condition data may be: The rated performance and power of the heat source A, the price of the energy being used for the heat source A, the applicable energy tariff as a function of the time of day, the energy tariff as a function of power demand and consumption, and other parameters associated with the optimized operation of the heat source A and with cost efficiency.

In view of the nature of these information, the condition data source 23 may take various forms. For instance, the condition data source 23 may be a database provided with a user interface such that the information is updated on a regular basis. The condition data source 23 may be connected to an external source of information, such as the internet, such that the relevant information may be acquired automatically or provided by suppliers.

The operation identifier 22 will therefore determine if and when the heat source A is to be actuated to store energy in the energy accumulator 11, in order to optimize energy consumption both in view of energy tariffs and optimized heat source operation. For instance, the operation identifier 22 determines, as a function of the storage capacity of the energy accumulator 11 and of the production capacity of the heat source A, the time of operation required to restore the level of energy in the energy accumulator 11. It may be preferred to avoid short cycles of operation for the heat source A, whereby the condition data provided by the condition data source 23 may be a desired minimal period of operation for the heat source A.

Figure 2:
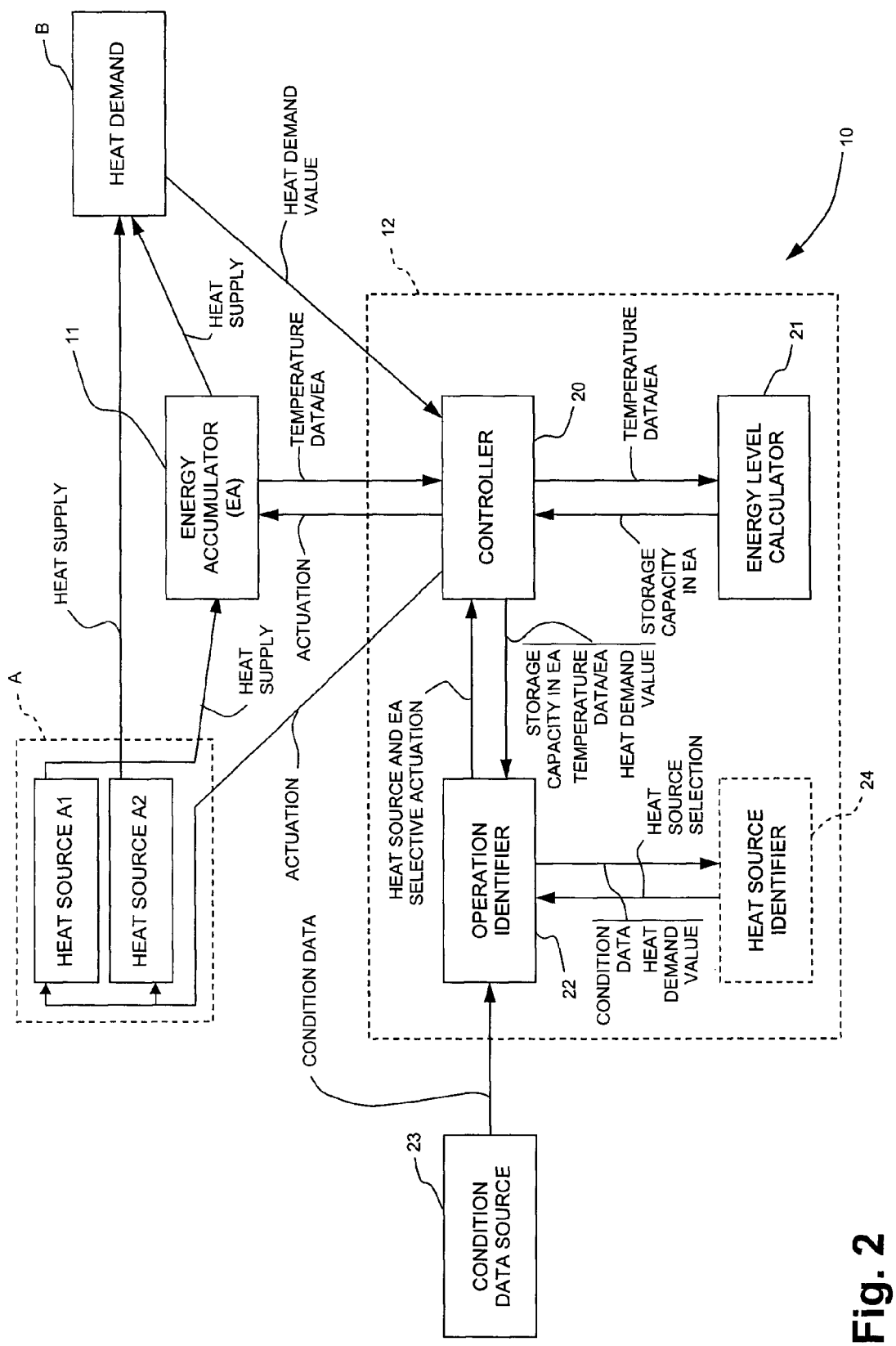
FIG. 2 is a block diagram illustrating the energy accumulator system of FIG. 1, in which the heat source consists of two different sources.

Referring to FIG. 2, the heat source A is shown consisting of two different heat sources, namely heat sources A1 and A2. For instance, some plants have two or more boilers in order to have the capacity to meet high demands of heat. Some processes (e.g., pulp and paper machine, food processing, plastic molding) require steam, whereby sufficient steam producing capacity is necessary to avoid steam shortage in the processes.

In storing heat in the energy accumulator 11, it may be required to operate only one of the heat sources A1 and A2. Accordingly, a heat source identifier 24 is provided in association with the operation identifier 22 to determine which one of the two heat sources A1 and A2 is to be used. The heat source identifier 24 receives condition data that will enable the heat source identifier 24 to select the heat source. For instance, the condition data includes the tariffs associated with the types of energy of the heat sources A1 and A2.

It is pointed out that the heat sources A1 and A2 may be complementary/opposite (i.e., cold heat and hot heat). For instance, in the case in which the heat demand B is a ventilation system, the heat to be supplied to the ventilation system may be for heating (i.e., hot heat) or for air conditioning the ventilation air (i.e., cold heat).

In such a case, the heat source identifier 24 identifies the appropriate heat source to be actuated, a furnace or an evaporator of a refrigeration circuit, as a function of the heat demand value.

Example 1

Refrigeration or Chilled Water Production System with Thermal Storage

This application operates in conditions with temperatures ranging between −40° C. and +10° C. For this application, a suitable storage material for the energy accumulator 11 is a compound of different materials which may include biphenyl-diphenyl ether eutectic mixture, diphenil oxide, drakeol, phenyl ether, glycol, alkanes, N-paraffin hydrocarbon chain, glycerin, water, tridecane, tetradecane, hydrocarbon wax, glycerol, 1,2,3-propanetriol, appropriately chosen as a function of the heat source A and the heat demand B.

Example 2

Heating and Air Conditioning Applications with Thermal Storage

This application operates in conditions with temperatures ranging between +5° C. and +70° C. For this application, a suitable storage material for the energy accumulator 11 is a compound of different materials which may include biphenyl ether, phenyl ether, glycol, alkanes, N-paraffin hydrocarbon chain, glycerin, water, carbon tetrabromide, tetradecane, hydrocarbon wax, pentadecane, hexadecane, glycerol, 1,2,3-propanetriol, appropriately chosen as a function of the heat source A and the heat demand B.

Example 3

High-Temperature Heating Applications with Thermal Storage

This application operates in conditions with temperatures ranging between +60° C. and +450° C. For this application, a suitable storage material for the energy accumulator 11 is a compound of different materials which may include biphenyl ether, phenyl ether, ammonium chloride, potassium chloride, boron trioxide, potassium hydroxide, sodium hydroxide alkanes, N-paraffin hydrocarbon chain, glycerin, pentadecane, hexadecane, heptadecane, hydrocarbon wax, appropriately chosen as a function of the heat source A and the heat demand B.

The invention claimed is:

1. An energy accumulator system for accumulating heat from a heat source for subsequent supply to a heat demand, comprising:
 an energy accumulator having a storage material adapted to be physically separated and in a heat-exchange relation with a fluid from the heat source so as to store heat produced by the heat source, the storage material and the fluid being different;
 a controller connected to the energy accumulator to obtain temperature data with respect to the storage material, and to the heat source so as to selectively actuate the heat source;
 an energy level calculator associated with the controller, the energy level calculator determining a storage capacity in the energy accumulator as a function of temperature data of the storage material; and
 an operation identifier associated with the controller, the operation identifier determining when to store energy in the energy accumulator as a function of the storage capacity and of condition data pertaining to the heat source;
 whereby the controller actuates the energy accumulator and the heat source to store heat in the energy accumulator.

2. The energy accumulator system according to claim 1, further comprising a plurality of the heat source with the energy accumulator adapted to be in heat-exchange relation with said plurality, and a heat source identifier associated with the operation identifier so as to select one heat source of said plurality to store heat in the energy accumulator when the operation identifier commands to store energy.

3. The energy accumulator system according to claim 2, wherein one of said plurality of heat source is a cold heat source, and the other of said plurality of heat source is a hot heat source.

4. The energy accumulator system according to claim 2, wherein a first heat source of said plurality is operated by a first type of energy, a second heat source of said plurality is operated by a second type of energy, with the condition data being associated with the price/tariff of the first type and the second type of energy.

5. The energy accumulator system according to claim 1, wherein the condition data is associated with at least one of an energy price and an energy tariff as a function of the time of day.

6. The energy accumulator system according to claim 1, wherein the heat source and the heat demand operate at temperatures ranging between −40° C. and +10° C., and the storage material is a compound of materials selected from at least one of biphenyl-diphenyl ether eutectic mixture, diphenil oxide, drakeol, phenyl ether, glycol, alkanes, N-paraffin hydrocarbon chain, glycerin, water, tridecane, tetradecane, hydrocarbon wax, glycerol, 1,2,3-propanetriol.

7. The energy accumulator system according to claim 6, wherein the heat source and heat demand involve refrigeration and a chilled water production system.

8. The energy accumulator system according to claim 1, wherein the heat source and the heat demand operate at temperatures ranging between +5° C. and +70° C., and the storage material is a compound of materials selected from at least one of biphenyl ether, phenyl ether, glycol, alkanes, N-paraffin hydrocarbon chain, glycerin, water, carbon tetrabromide, tetradecane, hydrocarbon wax, pentadecane, hexadecane, glycerol, 1,2,3-propanetriol.

9. The energy accumulator system according to claim 8, wherein the heat source and heat demand involve heating and air conditioning.

10. The energy accumulator system according to claim 1, wherein the heat source and the heat demand operate at temperatures ranging between +60° C. and +450° C., and the storage material is a compound of materials selected from at least one of biphenyl ether, phenyl ether, ammonium chloride, potassium chloride, boron trioxide, potassium hydroxide, sodium hydroxide alkanes, N-paraffin hydrocarbon chain, glycerin, pentadecane, hexadecane, heptadecane, hydrocarbon wax.

11. The energy accumulator system according to claim 10, wherein the heat demand is for a relatively high-temperature heating application.

12. The energy accumulator system according to claim 1, wherein the storage material is selected so as to change phase during heat exchange with the heat source, and wherein the energy level calculator determines the storage capacity as a function of a calculation of the proportions of the storage material in two different phases.

* * * * *